J. M. HUNTER.

Boots and Shoes.

No. 9,034. Reissued Jan. 6, 1880.

Witnesses:
K. M. Caplinger.
R. Cornett.

Inventor:
J. Monroe Hunter
Per
J. Burke, Fraser & Cornett
Attys.

N. PETERS, PHOTO-LITHOGRAPHER, WASHINGTON, D. C.

UNITED STATES PATENT OFFICE.

JOHN MORRISON HUNTER, OF MORRISTOWN, NEW JERSEY.

BOOT AND SHOE.

SPECIFICATION forming part of Reissued Letters Patent No. 9,034, dated January 6, 1880.

Original No. 122,948, dated January 23, 1872. Application for Reissue filed November 25, 1878.

DIVISION A.

*To all whom it may concern:*

Be it known that I, JOHN MORRISON HUNTER, of Morristown, in the county of Morris and State of New Jersey, have invented certain new and useful Improvements in Boots and Shoes, of which the following is a specification.

My invention relates to improvements in the bottoms or soles of boots and shoes. The sole is formed of several thicknesses of material, with a view to warmth and elasticity without preventing the escape of perspiration. One important point attained is an unusually efficient ventilation of the space below the foot.

The following is a description of what I consider the best means of carrying out my invention, reference being had to the accompanying drawings, in which—

Figure 1:
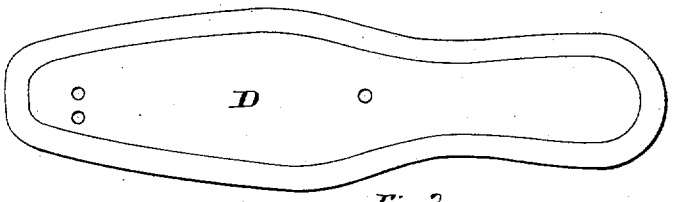
Figure 2:
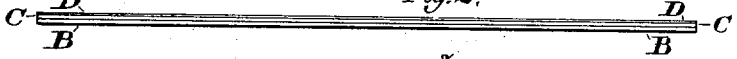
Figure 3:
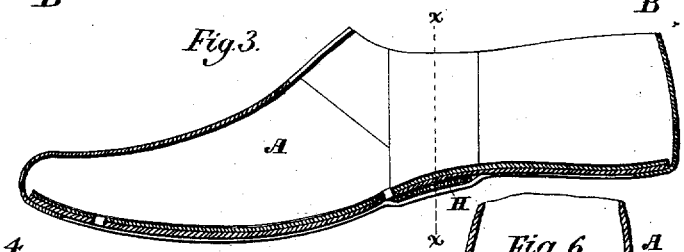
Figure 4:
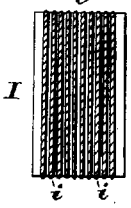
Figure 5:
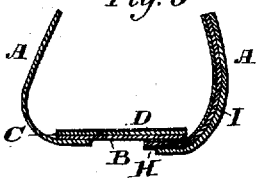
Figure 6:
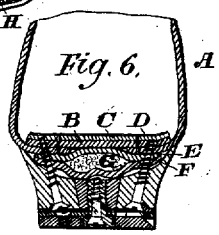
Figure 7:
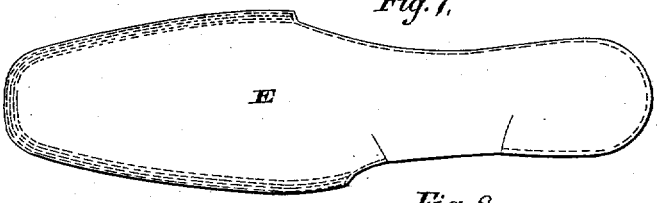
Figure 8:
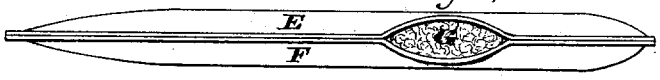
Figure 9:
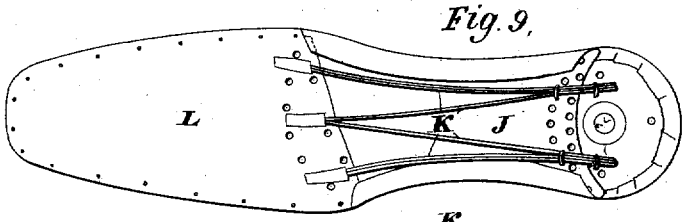
Figure 10:
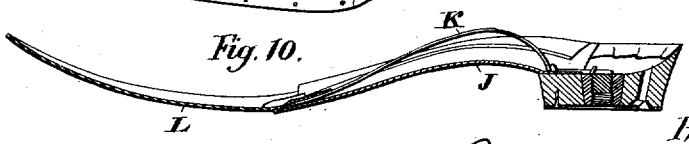

Figure 1 is a top view of the inner sole; Fig. 2, an edge view of the same. Fig. 3 is a longitudinal section through the inner sole and upper. Fig. 4 is a face view of my piece inserted for ventilation in the upper or vamp. Fig. 5 is a cross-section of Fig. 3, taken in the plane of the line *x x*. Fig. 6 is a cross-section through the heel of a completed shoe. Fig. 7 is a top view of my middle sole. Fig. 8 is an edge view of the same. Fig. 9 is a top view of the shell which fits under the middle sole. Fig. 10 is a longitudinal section of the same.

The upper or vamp A may be of leather or any ordinary or suitable material; but I will describe it as of leather. Some room for choice in the selection of materials may be assumed in regard to the several parts of the sole; but I will describe only what I consider the best. The inner sole is strong but permeable; its lower layer, B, is of pasteboard, the next, C, is of drugget, and the upper, D, is muslin. These are made up in sheets with paste, and pressed or rolled, and then dried. The soles are to be cut out of it by stamp-cutters in the same manner as in cutting soles of leather. Then a considerable number of these soles are made up in a pile and pressed together, and the edge surface of the whole mass saturated with varnish of shellac and alcohol. After allowing them to remain a brief period in this condition the pressure is relaxed, the press opened, and the several inner soles are taken out of the pile and allowed to harden separately. This gives each sole a character permeable in the middle and waterproof at the edge, with a very desirable state of rigidity, elasticity, and non-conductivity of heat.

I form a peculiar middle sole of two thicknesses of drugget, E F, sewed together around a portion of its periphery, and afterward cemented with a solution of shellac containing lamp-black. A space at one side of the shank is left open to allow access to the interior space, G, for the addition or removal of material. The whole interior space is occupied by a thick layer of coarse hair. As good a quality of such hair as is commonly employed in stuffing mattresses will suffice. I prefer that it should be in a very curly condition, so as to give the greatest possible elasticity. South African or other coarse wool may serve.

In applying the parts together I introduce a flattened tube of tinned iron or other rigid material in the position represented by H in Figs. 3 and 5. This tube is open at both ends, and maintains an open communication, under all conditions, between the space above the middle sole and a considerable space along the interior of the upper. This flattened tube and its connections are fixed in the inner edge of the shank of the boot or shoe, where it cannot hurt or inconvenience the wearer. The portion of the upper or vamp immediately adjacent is lined with a piece of ribbed woven stuff, preferably woolen, I, (shown in Fig. 4,) with cords of hard-twisted cotton *i* cemented therein in parallel positions with a rubber cement. The ventilating-piece I *i* stands between the vamp and its lining, with the cords presented toward the leather, and the edges of the pieces are cemented to the leather, so that the spaces between the cords *i* and between the body of the material I and the vamp form a series of tubes or channels always open at each end, through which the air may pass up and down freely in the use of the boot or shoe.

It will be observed that the piece of ribbed stuff I *i* is of a width a little less than the width of the interior of the metallic tube H, and that it extends into said tube. The communication formed by the space between the cords *i* and the flattened tube H extends from the open air above into the space above the middle sole.

I employ a shank of oiled and blackened canvas, J, with longitudinal and oblique springs of metal K and a metal outsole, L, at the front or ball. The part J is formed of cotton trunk-canvas saturated with oxidized linseed-oil, making a very tough and impermeable material, and is secured to the upper side of the heel by shellac varnish and by nailing.

The springs K may be of round piano-wire, preferably varnished to prevent corrosion. These springs are secured to the heel by staples, and to the metallic sole L by soldering, as illustrated in Figs. 9 and 10. It is important that the springs should be so joined to the sole as to leave the surface of the outer face smooth and even. I therefore introduce the springs through holes a little forward of the rear edge of the metal L, and then extend them forward in grooves sunk by pressing the metal upward in a line extending forward from each hole. The channels thus made may be three-fourths of an inch in length, forming corrugations in the metal, being ridges on the upper side and grooves on the lower side of the sole. The springs being soldered in these grooves produce a nearly uniform surface on the lower side of the sole, and when the canvas shank J is applied it makes a completely smooth surface. The canvas is attached to the metal by cement and rivets. The edge of the metal sole L may be punctured, to allow its being secured to the parts above by rivets or screws. The saturated canvas shank should be made somewhat wider than it is intended to be used, and the edge should be folded upward and over. The double edge thus formed may then be secured to the work above by screws or nails.

The form and arrangement of the springs K are important. Secured, as they are, firmly to the heel, and bent at a sharp angle upward, they always hold the shank perfectly to the hollow of the foot—an object which has been long aimed at by manufacturers of shoes, but not heretofore satisfactorily attained. If, however, the sharp angle upward be avoided, then a flattened shank is produced, more suited to the form of the feet of some persons.

My above-described improvements are susceptible of various modifications without departing materially from my invention, among which may be mentioned, turning the insoles, formed as represented, in reverse position to that shown, thus bringing the pasteboard at the top and the muslin at the bottom; constructing the insole with muslin or with drugget or other felt at both top and bottom; using felt instead of drugget, or the application of any water-proof varnish or oxidized oil or of a solution of india-rubber to the edges of the insole and middle sole, instead of shellac varnish. Either insole or middle sole may be stiffened by a thin solution of plaster-of-paris or other suitable material, or enameled cloth may be used in some cases. The edges of the insole may be sewed, in addition to the saturation with water-proof cement.

With regard to my provisions for ventilation, it is important that when a shoe is provided with an elastic gore the ribbed strip I *i*, which forms the tubes for the ventilation, should be kept in position by inclosing it between two pieces of elastic—that is, there should be shirred rubber-cloth both outside and inside of the ribbed piece. The inside may, however, if preferred, be strips of elastic band, in case the ribbed piece extends up the whole height of the elastic; but this is not a necessity. It may find its exit externally at the lower edge of the elastic, or it may rise inside the elastic gore to a point just below the projecting bone known as the "tuberosity of the lower end of the tibia," and be held in that position between the gore and an elastic band, the air finding its way by reason of the space formed by the projection of that bone. With either construction the air will be warmed by the heat of the foot prior to its entrance into the elastic cavity of the middle sole.

I prefer to punch a few small holes in the body of the inner sole, to insure a high degree of permeability and to serve to ventilate the shoe above the inner sole.

The pasteboard may, for some kinds of shoes, be perforated over its entire surface with numerous small apertures. This may be considered almost absolutely essential, as it tends to promote what I am aiming at, and which has received heretofore too little attention—the production of a protection for the foot which, while thick and warm, is light, permeable, elastic, and in the highest degree conducive to health.

It is proof against external moisture, and is also at the same time effective in conveying away the moisture from the foot, which it does in the form of vapor mingled with the air which passes through the ventilating-channels, as explained.

The middle sole may be first applied to the upper and to the inner sole, in which case its solidified edge acts as a continuous welt about the shoe, to afford additional attachment for the other parts of the sole.

The saturated canvas of the shank may be secured by sewing or by water-proof cement, or by both, instead of the screws or nails named, or in addition thereto.

In securing the outer sole, when rivets are employed, the rivets may make their own holes. If the sole is to be sewed to the upper, then the metal sole should be made a little narrower than the middle sole, thus leaving an edge overlapping the metal, through which edge the stitches may be passed; but if the sole is to be riveted to the upper then the metal and middle sole should be of nearly equal width.

In the shank, instead of wire, a sheet-metal spring may be employed, or a shank of india-rubber, leather, or other suitable material may be used.

In the part J, instead of oxidized oil, varnish or a solution of rubber may be employed. The same variety of saturating material may be used for the edges of my insole and middle sole. In the latter situation, being water-proof, indurated, and elastic, it is also a durable attachment between the sole and upper.

The hard cords *i* may be cemented with any suitable cement in place of rubber cement, as, for example, glue, shellac, or the like.

It will be understood that a wearing-sole or half-sole, below the whole front portion, will usually or always be employed. It may be of leather or of any ordinary or suitable material.

I claim as my invention—

1. A shoe provided with the within-described permeable inner sole, composed of pasteboard, with open or unsaturated woolen and muslin on one or both sides thereof, the parts being compressed together and joined at the edge by a water-proof cement, substantially as specified.

2. In combination with the ribbed piece I *i*, the tube H, open at both ends and adapted to maintain communication under all circumstances across the seam at the edge of the sole, substantially as set forth.

3. A boot or shoe provided with the elastic middle sole, E F G, having hair inclosed between two woolen fabrics securely joined at the edges, and with means for ventilating the space above, substantially as shown.

4. The bent-wire springs K, arranged substantially as described, having a fixed attachment to the heel, and also to the metallic sole, bending upward, so as to retain the shank to the cavity of the foot, substantially as herein described.

In witness whereof I have hereunto signed my name in the presence of two subscribing witnesses.

JOHN MORRISON HUNTER.

Witnesses:

ARTHUR C. FRASER,
HENRY CONNETT.